United States Patent [19]

Spence

[11] Patent Number: 5,746,372

[45] Date of Patent: May 5, 1998

[54] BIODEGRADABLE CUP HOLDER

[75] Inventor: Orville Spence, Arlington, Tex.

[73] Assignee: American Excelsior Company, Arlington, Tex.

[21] Appl. No.: 766,161

[22] Filed: Dec. 12, 1996

[51] Int. Cl.[6] .................................................. B65D 3/28
[52] U.S. Cl. ........................... 229/403; 270/738; 229/400
[58] Field of Search ................................ 229/400, 403, 229/404, 4.5, 906.1; 220/737, 738, 739, 903

[56] References Cited

U.S. PATENT DOCUMENTS

| D. 242,825 | 12/1976 | Morris | D15/7 |
|---|---|---|---|
| 1,950,505 | 3/1934 | Matters | 220/737 |
| 2,028,566 | 1/1936 | Seipel et al. | 220/737 |
| 2,661,889 | 12/1953 | Phinney | 229/4.5 |
| 3,049,277 | 8/1962 | Shappell | 229/403 |
| 3,908,523 | 9/1975 | Shikaya | 229/403 |
| 3,915,296 | 10/1975 | Spencer | 229/906.1 |
| 4,099,976 | 7/1978 | Kraskin et al. | 106/18.35 |
| 4,261,501 | 4/1981 | Watkins et al. | 229/404 |
| 4,299,100 | 11/1981 | Crisman et al. | 62/457 |
| 4,966,303 | 10/1990 | Jones | 220/411 |
| 5,042,258 | 8/1991 | Sundhar | 62/3.2 |
| 5,102,036 | 4/1992 | Orr et al. | 220/903 |
| 5,186,350 | 2/1993 | McBride | 220/412 |
| 5,203,490 | 4/1993 | Roe | 229/403 |
| 5,222,656 | 6/1993 | Carlson | 229/403 |
| 5,385,260 | 1/1995 | Gatcomb | 220/415 |
| 5,425,497 | 6/1995 | Sorensen | 220/738 |
| 5,454,484 | 10/1995 | Chelossi | 220/738 |

FOREIGN PATENT DOCUMENTS

35/076765A 6/1977 Japan ............................... 229/403

OTHER PUBLICATIONS

60/013,437 Mar. 15, 1996, Spence.

*Primary Examiner*—Gary E. Elkins
*Attorney, Agent, or Firm*—Jenkens & Gilchrist, P.C.; J. Kevin Gray

[57] ABSTRACT

A beverage container holder formed from a water soluble starch based material in a configuration facilitating the wrap around engagement of a beverage container for the insulation thereof and convenience of the user. The cup holder may be provided in a generally planar sheet construction for facilitating the packaging, shipping and handling thereof and with an interlocking tab assembly for facilitating the securement around a beverage container, such as a coffee cup. Once used for insulating the hands of a user, the cup holder of the present invention may be discarded and disposed of with water or the like to comprise an environmentally convenient, water soluble, biodegradable assembly.

15 Claims, 2 Drawing Sheets

BIODEGRADABLE CUP HOLDER

BACKGROUND OF INVENTION

1. Field of the Invention

The present invention relates to beverage cup holders and, more particularly, but not by way of limitation, to a beverage cup holder constructed of water soluble biodegradable material facilitating the environmentally safe and effective disposal thereof.

2. History of Related Art

It is well known in the prior art to utilize disposable cups made of paper, plastic, foam and other materials for containing hot and cold beverages such as coffee, tea, milk, and the like. One of the more conventional containers used in fast food restaurants is the paper cup. Unfortunately hot beverages generally require some form of insulation when served in paper cups. While relatively economical to fabricate, paper cups are generally provided in relatively thin walled construction affording limited insulation to the hands of the user. For this reason another type of cup is often used; a foam container made from expanded polystyrene. The foam cup design is generally superior to paper cups for serving hot coffee and the like. There are, however, environmental reasons for not fabricating the expanded polystyrene foam cups in thicker wall configurations for more effectively insulating the relatively hot beverages from the hands of the user. These reasons include cost and the negative environmental impact of expanded polystyrene foam. It is well known that expanded polystyrene is a petroleum product which is not readily biodegradable.

Other forms of beverage cups which may contain hot liquid, such as the paper cups described above, provide even less thermal insulation than foam cups. Paper cups therefore often require some form of insulative cup holder in order to be well received in the hot beverage market. Not all insulated cup holders are easy to use, disposable or are environmentally friendly. For this reason, recent innovations in cup holder designs have been recognized as patentable inventions. U.S. Pat. No. 5,385,260, for example, teaches a disposable cup assembly utilizing a separate insulated sleeve for a paper cup. The sleeve is scored and formed with generally radically extending indentations for providing a physical separation between the hand of the user and the outside wall of the paper cup. The sleeve is formed from sheet material, preferably paper and the assembly includes a cohesive compound to instantaneously adhere the sleeve to the paper cup before use. Likewise, U.S. Pat. No. 5,454,484 teaches an insulator for a plastic or paper cup. The use of strong, thermally insulated card stock with select folds is taught. U.S. Pat. No. 5,425,497 teaches a cup holder in the form of a sheet of pressed paper pulp having a multitude of nubbins and depressions. These and other insulator assembly designs facilitate the use of more environmentally friendly materials. The use of paper pulp and card stock, while superior to the use of polystyrene foam is not totally without environmental concern. Paper is not quickly biodegradable and may be littered to create trash. Moreover, the clean-up of paper trash is not without its associated costs.

It would be an advantage, therefore, to provide a beverage cup holder that affords effective thermal insulation and is yet environmentally safe, readily biodegradable, and preferably water soluble to eliminate the problem of disposing of bulky paper, card stocks or thicker cup holder configurations. The present invention provides such an assembly by utilizing starch based, substantially water soluble, biodegradable materials as an integral component of the cup holder.

SUMMARY OF INVENTION

The present invention relates to insulated beverage cup holders. More particularly, one aspect of the present invention comprises an insulated beverage cup holder constructed of readily biodegradable, substantially water soluble material and configured in an elongate pattern facilitating the fabrication, shipping, storage and disposal thereof. The pattern comprises opposite ends of a planar section which are adapted for securement one to the other to comprise an insulated beverage cup holder of pre-selected dimensions.

In another aspect, the above-described invention comprises a planar sheet formed from a starch based material having the opposite ends thereof configured for an interlocking relationship. The interlocking relationship of the opposite ends is provided by a locking tab formed in one end and an aperture formed in the other adapted for receipt of the locking tab therein. In operation, the locking tabs will selectively interlock upon engagement therebetween for insulating a beverage cup from the hands of a user. Upon completion of the use of the insulator, it may be discarded for rapid decomposition in the presence of moisture.

BRIEF DESCRIPTION OF THE DRAWINGS

A more complete understanding of the method and apparatus of the present invention may be had by reference to the following Detailed Description when taken in conjunction with the accompanying Drawings wherein.

DETAILED DESCRIPTION

Figure 1:
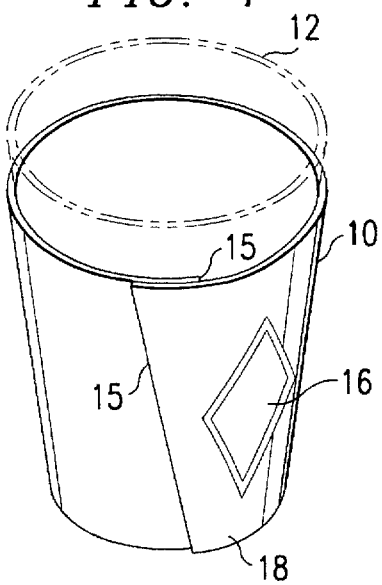
FIG. 1 is a perspective view of an insulated beverage container holder constructed in accordance with the principles of the present invention and placed about a conventional drinking cup.

Referring first to FIG. 1 there is shown a perspective view of the insulated beverage container holder 10 of the present invention placed around a beverage cup 12 (shown in phantom) of the type used for containing a hot beverage therein. The beverage cup 12 may be formed of paper, plastic, polystyrene foam or the like, which is commonly used for the serving of coffee and other hot beverages from fast food restaurants and similar commercial dining establishments.

Still referring to FIG. 1, the present invention provides a low cost, environmentally safe, rapidly biodegradable (substantially water soluble) insulated beverage container holder 10 which may be provided to the user at fast food restaurants with the same ease as proving a napkin, straw, or the like. The ends 15—15 of this embodiment have been secured one to the other with adhesive, or the like. Likewise, the insulated beverage container holder 10 may be constructed with a desired indicia 16 formed on the outer surface 18 thereof for imparting advertising or other commercial purpose. With the present invention, however, the negative commercial impression of trash bearing advertising is substantially eliminated by moisture. Unlike trashed paper napkins negatively identifying a fast food restaurant, the indicia of the present invention will effectively dissolve with rain or the spray of water.

Figure 2:
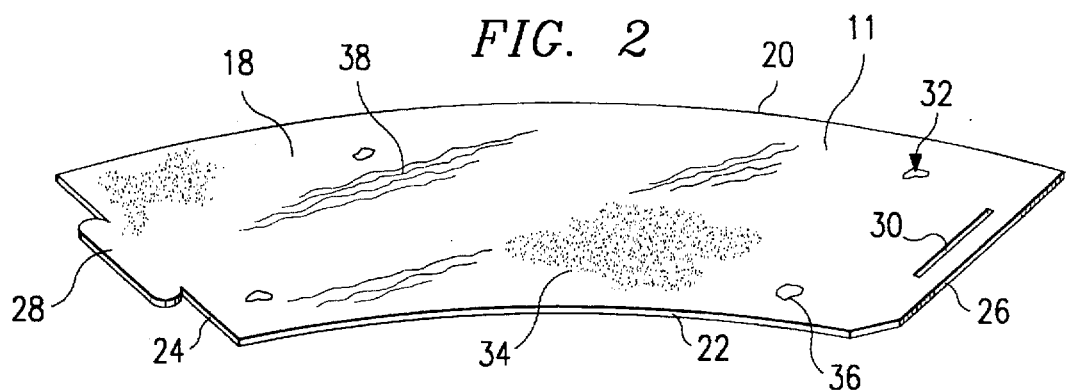
FIG. 2 is a perspective view of the insulated beverage container holder of FIG. 1 shown in a planar configuration of the type used for storage, shipping and handling.

Referring now to FIG. 2 there is shown a perspective view of the insulated beverage container holder 10 of FIG. 1, presented as a planar body 11 as it would appear immediately following fabrication, as well as during handling, shipping and storage. As described below, the holder 10 is preferably extruded in sheet form and then cut or stamped to the desired shape of the planar body 11. Because of this configuration, the planar body 11 may be stacked and handled more efficiently.

Still referring to FIG. 2, the planar body 11 is stamped or cut into an arcuate shape having curved top edge 20 and curved bottom edge 22. Opposite ends 24 and 26 are, in this embodiment, formed with interlocking tab 28 and slot 30. The surface 18 is formed with a plurality of randomly shaped and spaced-apart depressions 32. The depressions 32 may comprise a multitude of small pockets 34, larger indentations 36 of irregular shape, and elongate grooves 38. The depressions 32 may be randomly formed in the extrusion process of starch based material, and provide "dead air" space between the cup 12 and the body 11. Dead air spaces as well as the spongy characteristic of the water soluble, biodegradable material of the present invention reduce the rate of heat transfer through the holder 10.

Addressing now the water soluble, biodegradable aspect of the present invention, the material of holder 10 is as referenced above preferably starch based. Starch is a polysaccharide typically comprising a mixture of about 20–25% amylose and about 75–80% amylopectin which is organized into compact granular structures. Amylose is a linear polymer of D-anhydroglucose units which are linked by alpha-1, 4-D glucosidic bonds. Starch-based biodegradable materials are typically produced by mixing one or more components to form a material. Subsequently, the material is extruded and then cut, milled, shredded or otherwise formed into one or more shapes and/or sizes. While traditional die extruders are typically used, heretofore the biodegradable material has generally not been extrudable in a form less than ¼" in thickness, except as set forth in Co-Pending patent application Ser. No. 60/013,437 filed 15 Mar. 1996.

Figure 4:
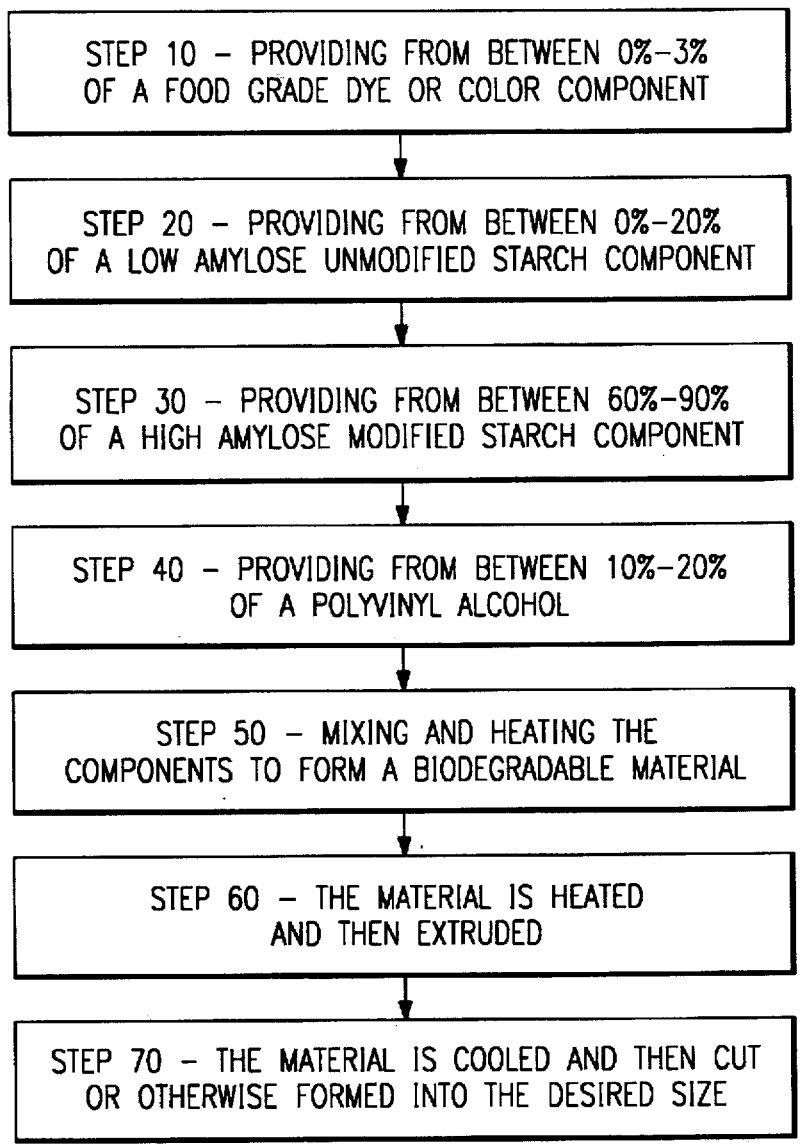
FIG. 4 is a flowchart illustrating the steps of one embodiment of a method of manufacturing biodegradable sheet material for fabrication of the insulated beverage container holder of present invention.

Referring now to FIG. 4, there is shown the series of steps of one embodiment of a method of manufacturing biodegradable sheet material for fabricating the cup holder of the present invention. The process is presented for example only, and other processes may be utilized. The starch sheet used herein can be made from any plant starch (such as vegetable starch from wheat, rice or tapioca) using additives like PVA, as described below.

Referring still to FIG. 4, the process preferably includes the use of a continuous extrusion system utilizing extruders known in the art. In a preferred embodiment, an intermeshing, self-wiping, co-rotating, twin screw extruder is used in the process. Since the advantageous physical properties of the biodegradable sheet material of the present invention depend in part upon proper and complete mixing of the raw components, exact feeding, mixing, heating and cooling within the process is crucial to the process. Although an intermeshing, self-wiping, co-rotating, twin screw extruder is described, it should be noted that any appropriate type of extruder, such as a single screw type extruder, can be utilized.

First, if color is desired, food grade dyes and/or colors are provided in preferable amounts of between 0% and 3% in step 10, depending on desired tint. Food grade dyes are selected since the resultant sheet material is biodegradable, although other dyes could be used, if desired. In the event color is added, the percentage amounts of the additional components are adjusted accordingly. In step 20, from between 0% and 20% of low amylose unmodified starch is provided. Next, high amylose modified starch is provided in a range of between 60%–90% in step 30. The foregoing components are preferably provided in their dry form with the modified starch preferably a high-amylose starch of around 70% amylose content modified with propylene oxide.

In step 40, from between 10% and 20% (and preferably between 10% and 15%) of polyvinyl alcohol (PVA) is provided as a component. Although a biodegradable material capable of being formed into a sheet is produced throughout the range of PVA listed above, the optimum percentage observed to date is between 12% and 12.5%. Other percentages may be found optimal for the holder 10 of the present invention depending upon the type of vegetable starch used (wheat, rice, tapioca, or the like). Preferably, a substantially hydrolyzed PVA is used. An example of an appropriate PVA is Airvol 325™ by Air Products and Chemicals of Irving, Tex. Airvol 325™ is fully hydrolyzed (98.0%–98.8%) and has a viscosity of 28.0–32.0 cps (4% aqueans solution at 20° C.) and pH of between 5.0–7.0.

In the next step of the process, step 50, the components are mixed in the extruder along with tap water. The resultant mixture is then heated to a temperature of between 19° F. and 400° F. before it is kneaded and sheared and extruded using a die in step 60. Much of the heat is provided by pressure exerted on the material by the extruder during the previous steps. These steps are preferably performed by a continuous process extruder, but could be achieved manually or by other processes, if desired. Due to the unique formulation of the biodegradable material, the extrudate balloons out of the die, forming the thin sheet size of the biodegradable material of less than ⅛", having the depressions 32 formed therein. The actual thickness of the sheet may be varied depending upon the desired magnitude of insulation required for the holder 10.

In step 70, the extrudate is cooled and cut to a desired size and shape. These steps of the process can likewise be accomplished by one or more of any means known within the art, as set forth in the above-referenced co-pending application Ser. No. 60/013,437.

Although the modified high amylose material exhibits good expansion characteristics, unmodified starches with lower amylose concentrations can be added (in approximately 0–20% levels) to aid in the expansion characteristics of the material. High amylose starches are used to impart flexibility to the biodegradable particulate matter. Such flexibility, if desired, can also be achieved through additives, such as polyvinyl alcohol or similar homopolymers. The material may have a specific density of from approximately 0.5 to 20 lbs/ft$^3$, although other densities may be determinated to be preferable for the holder 10 of the present invention.

Figure 3:
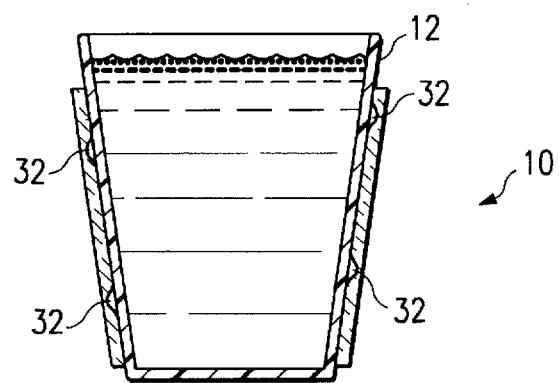
FIG. 3 is a side elevational cross-sectional view of the insulated beverage container holder of FIG. 1 taken along the lines 3—3 thereof and illustrating its placement about a beverage cup in accordance with the principles of the present invention.

Referring now to FIG. 3, once formed according to the present invention method, the biodegradable sheet material can be cut or stamped into the shape described in FIG. 2. Importantly, the holder 10 of the present invention can be used without prior planning and concern of clean up once its disposal is desired. The water-soluble, biodegradable material dissolves upon contact with liquids such as water, thereby making clean up a simple process of bringing water into contact with the sheet material. It should also be noted that once the material of holder 10 comes into contact with liquid, it will become "tacky" thereby permitting it to lightly "stick" to the cup 12, if desired. This step may be effected when the holder 10 is commercially used. The beverage container, or cup 12, may be dampened to cause the holder 10 to lightly stick to said cup. A "tacky" region 13 is thus shown in FIG. 3 to illustrate a method of and apparatus for lightly sticking the holder 10 to the cup 12 for the convenience of the user.

It is thus believed that the operation and construction of the present invention will be apparent from the foregoing description. While the method and apparatus shown or described have been characterized as being preferred it will be obvious that various changes and modifications may be made therein without departing from the spirit and scope of the invention as defined in the following claims.

What is claimed is:

1. An improved beverage container holder of the type adapted for placement around a beverage container and being formed from a band adapted for wrapping around said container and providing insulation from said beverage container, said improvement comprising said band being formed of water soluble, biodegradable material with a plurality of randomly shaped, spaced-apart depressions distributed on portions thereof creating an air gap therein and between said band and said beverage container.

2. The apparatus as set forth in claim 1 wherein said water soluble, biodegradable material is starch based.

3. The apparatus as set forth in claim 2 wherein said starch is a high amylose modified starch.

4. The apparatus as set forth in claim 2 wherein said starch comprises vegetable starch processed from the group consisting of corn, wheat, rice and tapioca.

5. The apparatus as set forth in claim 1 wherein said band is formed with means for securing opposite ends of said band one to the other.

6. The apparatus as set forth in claim 5 wherein said securing means comprises a tab formed on a first end of said band and a slot formed in an opposite end of said band, said slot being sized to receive said tab therein.

7. The apparatus set forth in claim 5 wherein said securing means comprises an adhesive disposed on opposite ends of said band securing said ends one to the other.

8. The apparatus set forth in claim 1 wherein said water soluble band is adapted for creating a tacky surface for attachment to said container in the presence of moisture for securement of said band to said cup for the use thereof.

9. The apparatus as set forth in claim 1 wherein said band comprises an extruded sheet of high and low amylose starch presenting an irregular surface configuration thereon with an elongate length thereof.

10. A biodegradable insulating band for hot beverage containers, said band comprising:

an elongate body of extruded, biodegradable, starch based, water soluble material having a length sufficient for extending around said beverage containers and means for securing opposite ends of said biodegradable material around said beverage container.

11. The apparatus as set forth in claim 10 wherein said biodegradable material is formed of high and low amylose starch facilitating the dissolving of said band in an aqueous environment.

12. The apparatus set forth in claim 10 wherein said band further comprises a tab formed on a first end of said band and a slot formed in a second end of said band, said slot being sized to receive said tab therein for the interlocking engagement therebetween.

13. The apparatus set forth in claim 10 wherein said securing means comprises adhesive disposed on a first end of said band and adapted for securing a second opposite end of said band when positioned around said beverage container.

14. The apparatus set forth in claim 10 wherein said band is extruded into an elongate member having certain irregularities formed therein comprising depressions of random shape adapted for insulating said band from said beverage container.

15. The apparatus set forth in claim 10 wherein said starch comprises vegetable starch processed from the group consisting of corn, wheat, rice and tapioca.

* * * * *

UNITED STATES PATENT AND TRADEMARK OFFICE
CERTIFICATE OF CORRECTION

PATENT NO. :     5,746,372
DATED      :     May 5, 1998
INVENTOR(S) :    Spence

It is certified that error appears in the above-identified patent and that said Letters Patent is hereby corrected as shown below:

Column 4, line 57-58    Replace "determinated"
                        With --determined--

Signed and Sealed this

Nineteenth Day of September, 2000

Attest:

Q. TODD DICKINSON

*Attesting Officer*           *Director of Patents and Trademarks*